United States Patent Office 2,917,147
Patented Dec. 15, 1959

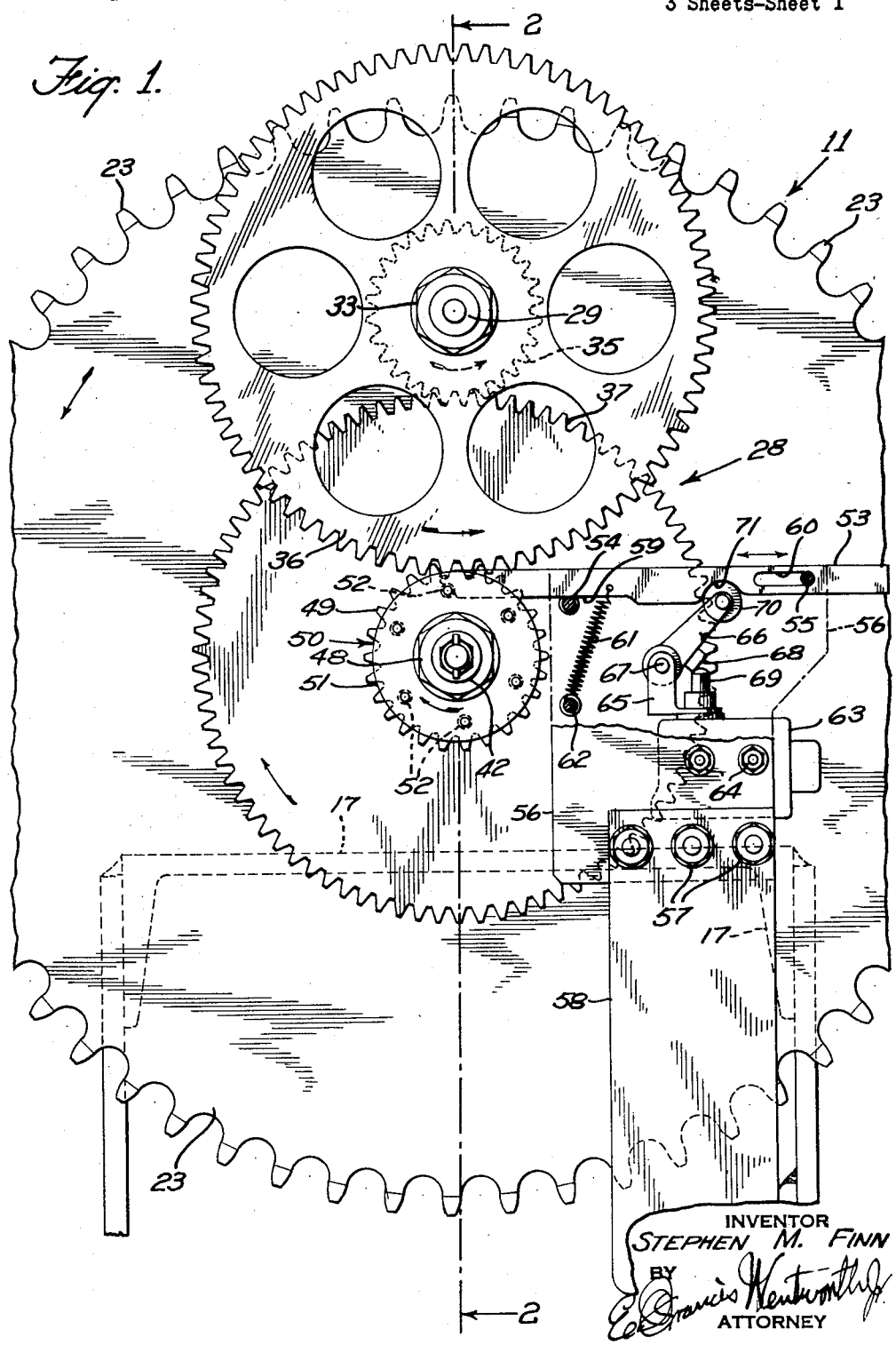

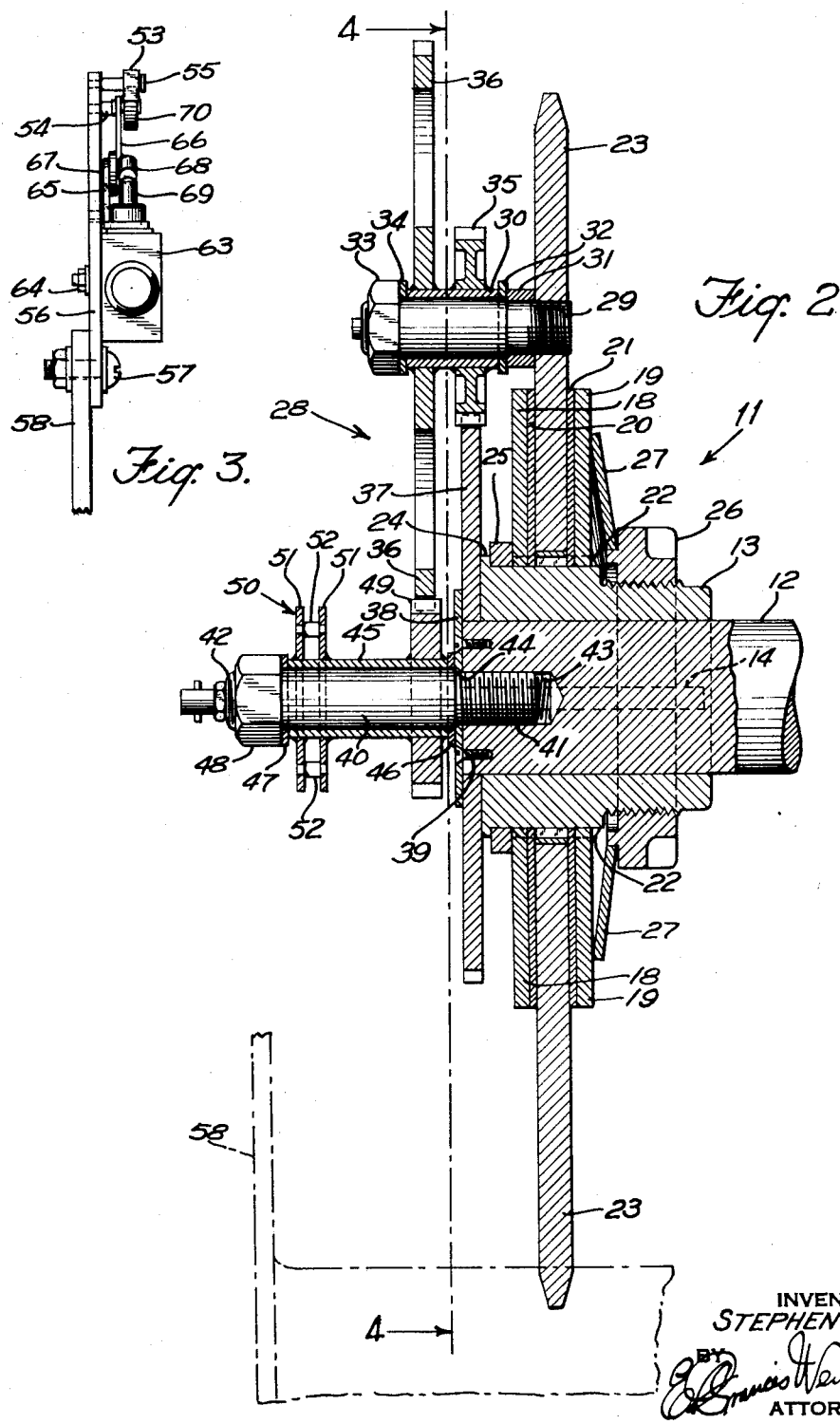

2,917,147

MOTION TRANSMITTING DEVICE

Stephen M. Finn, Freeport, N.Y., assignor to Foster Wheeler Corporation, New York, N.Y., a corporation of New York Application August 15, 1955, Serial No. 528,176

4 Claims. (Cl. 192—150)

This invention relates to motion transmitting mechanisms and more particularly to means for translating into useful work the differential rotation of two coaxially mounted members.

One well known mechanical means for transmitting rotary motion from one member to another member comprises a driving member rotatably mounted coaxially with a rotatively mounted driven member, the two members being drivably connected together by means providing for differential rotation of the members, such as a clutch or torque mechanism. The clutch or torque mechanism co-acts with the members to provide relative motion or slippage between the members to prevent damage to the latter, or parts connected to them, as a consequence of, as for example, an overload condition. Under normal operating speeds and load conditions the driving member, clutch mechanism and the driven member rotate together, that is, there is no differential rotation of the members.

Accordingly, it is an object of this invention to provide means for converting into useful work the relative rotation of a driving member and a driven member, which members are coaxially mounted in relation to each other and drivably connected to means providing for differential rotation of the members.

In accordance with the present invention a differential motion actuated mechanism or gear train assembly is operatively connected to a driving member and a driven member, which members are coaxially mounted and adapted for differential rotation. The assembly comprises a planetary gear and a driving gear coaxially mounted for conjoined rotation about their axes. The planetary and driving gears are supported on the driving member and are carried in a circular path around the axis of the driven member. A sun gear is secured to the driven member to rotate with the latter. The planetary and sun gear are in mesh and upon differential rotation of the driving and driven members the planetary gear rotates about its own axis as it is carried in a circular path around the sun gear. A driven gear is mounted for rotation adjacent the sun gear and is rotated by the driving gear. Rotation of the driven gear is transmitted to an output member, which output member is coaxially mounted with relation to the driven gear for conjoined rotation therewith. The output member is suitably adapted to engage a mechanism for the performance of useful work.

Other features and advantages will become apparent from the following description when considered in connection with the accompanying drawings forming a part thereof and in which:

Fig. 1 is an end view, in elevation, of a differential motion actuated mechanism according to the present invention operatively connected to a conventional rotary power transmission assembly.

Fig. 2 is a sectional view taken on line 2—2 of Fig. 1;

Fig. 3 is a fragmentary view in elevation of the switch member and support of Fig. 1.

Figure 4:
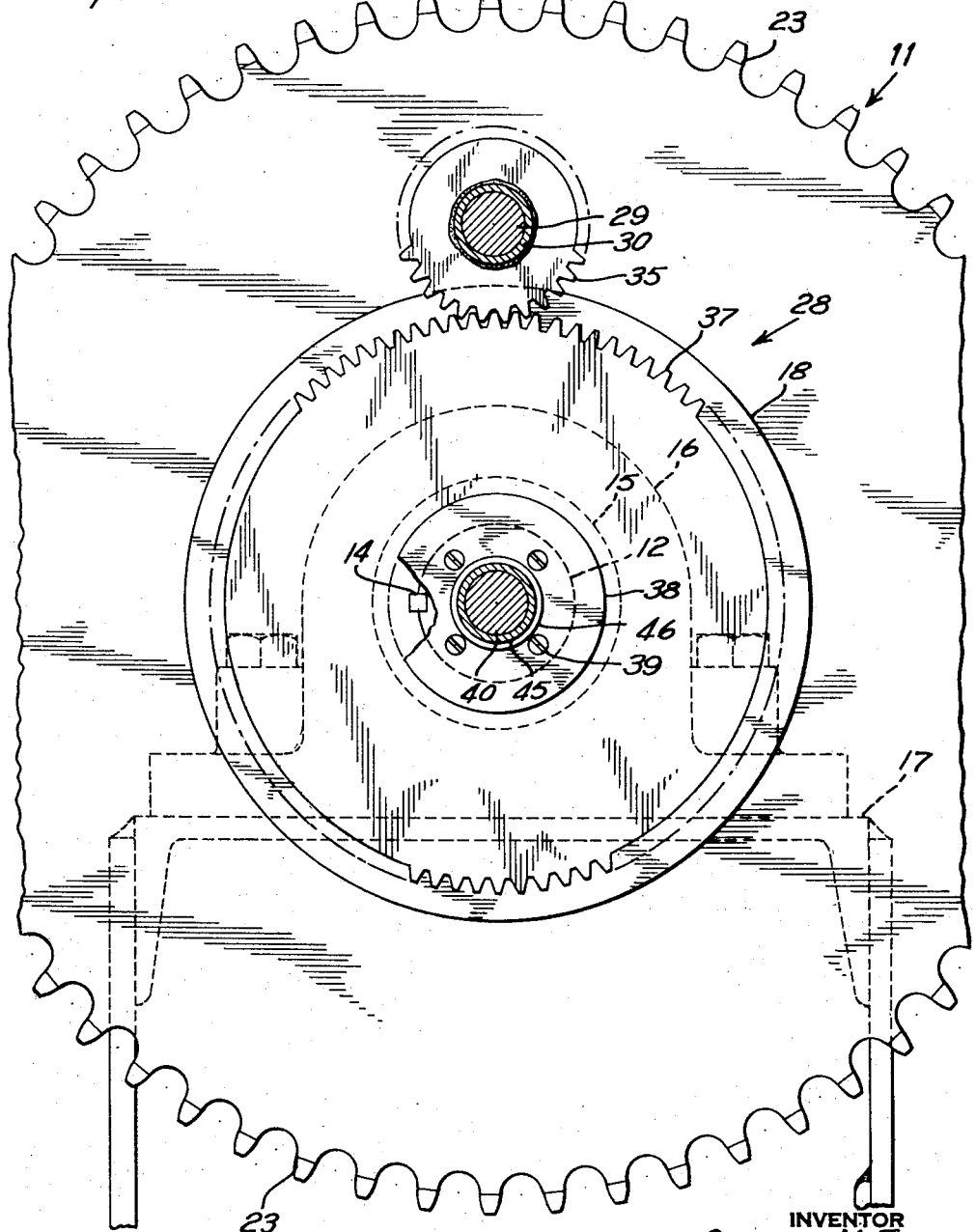
Fig. 4 is a view in section taken along line 4—4 of Fig. 2.

Referring now to the drawings, and more specifically to Figs. 1 and 2 hereof, the numeral 11 designates a conventional low speed rotary power transmitting assembly. Transmitting assembly 11 comprises a driven member or shaft 12 which has a collar or hub member 13 secured thereto by a key 14 and the shaft is suitably journalled for rotation about its longitudinal axis by journal bearings 15 disposed in a journal box 16 carried by a table 17, (Fig. 4). A pair of clutch or pressure plates 18 and 19 having clutch facings 20 and 21, respectively, are splined to the outer peripheral surface of hub member 13 by splines 22 and are rotatably carried by the hub. A driving member or sprocket wheel 23 is rotatably mounted on hub 13 between pressure plates 18 and 19 and is driven by a chain (not shown), in turn driven from a source of power (not shown). Hub 13 has flanged end portion 24 against which butts a spacer ring 25. Flange portion 24 and spacer ring 25 limit axial movement of plate 18 to the left in Fig. 2. An adjusting nut 26 is threaded on the end of hub 13, and disposed between the adjusting nut and plate 19 is a washer-like spring 27 which exerts a biasing force on plate 19 to clamp sprocket wheel 23 between plates 18 and 19. Rotation of sprocket wheel 23 is transmitted through clutch facings 20 and 21 to plates 18 and 19 which in turn rotate shaft 12 through hub member 13 and splines 22 and shaft 12. Nut 26 is adjustable to provide a predetermined torque load, at which load, sprocket wheel 23 slips between pressure plates 18 and 19, thus interrupting transmission of rotary motion to shaft 12. In order to utilize the differential rotation of sprocket wheel 23 and shaft 12, to perform useful functions, as for example, to operate a warning device and/or arrest rotation of sprocket wheel 23, a differential motion actuated mechanism 28 is connected between sprocket wheel 23 and shaft 12.

Mechanism 28 comprises a stud or pin 29 secured in any suitable manner, as for example, by threading or welding, to sprocket wheel 23. Pin 29 extends from sprocket wheel 23 and accommodates a sleeve 30 spaced from sprocket wheel 23 by a spacer member 31 and a thrust washer 32. The other end of pin 29 is threaded to receive a jam nut 33 and interposed between sleeve 30 and jam nut 33 is a second thrust washer 34. Thrust washers 32 and 34 are drawn tightly against the ends of sleeve 30 by jam nut 33 to prevent axial movement of sleeve 30, but the latter is still free to rotate on pin 29. Two gears 35 and 36, hereinafter referred to as the planetary gear and the driving gear, respectively, are secured in spaced relationship with each other to sleeve 30 by welding, or otherwise suitably secured to the sleeve.

A sun gear 37 is provided on shaft 12 and is restrained from rotational movement relative to the shaft by key 14 (Fig. 4) and from axial movement by hub 13 and a plate 38 secured to shaft 12 by screws 39, which hub and plate serve to clamp gear 37 therebetween. Sun gear 37 is disposed between sprocket wheel 23 and driving gear 36 and is in mesh with planetary gear 35. A cylindrical shaft extension member or stud 40 is provided with threaded end portions 41 and 42, and end portion 41 is threaded in a tapped portion 43 of shaft 12. Plate 38 is provided with a central opening 44 through which end portion 41 extends for connection to shaft 12. A second sleeve 45, hereinafter referred to as the driven sleeve, is loosely mounted on stud 40, but is restrained from axial movement by a pair of thrust washers 46 and 47. Washer 47 is positioned between jam nut 48 threaded on end portion 42 of stud 40 and sleeve 45, while washer 46 is disposed between plate 38 and the inner end of sleeve 45. A pinion or driven gear 49 is secured, as for example by welding, to sleeve 45 and is disposed in meshing engagement with driving gear 36. Output means 50 is provided on sleeve 45 and comprises a pair of spaced parallel discs 51 which have secured therebetween a plurality of circumferentially spaced pins 52.

Under normal load operating conditions, rotary transmission assembly 11 and differential motion actuated mechanism 28 move together. For example, under such conditions if sprocket wheel 23 is assumed to be moving in a counterclockwise direction as seen in Fig. 1, gear 35 is locked on gear 37 to thereby cause conjoined rotation of gears 36 and 49 and output means 50 in the same direction. When, for example, excessive load conditions exist sprocket wheel 23 slips between pressure plates 18 and 19 to thereby cause differential rotation between shaft 12 and the sprocket wheel. Assuming the same direction of rotation of the sprocket wheel 23, as indicated hereinbefore, planetary gear 35 creeps on gear 37 rotating in a counterclockwise direction and in a circular path about the axis of shaft 12. As a result, gear 36 is rotated in the same direction and causes pinion 49 to rotate in a clockwise direction with sleeve 40 and output means 50 rotating in the same direction.

A latch bar 53 is supported by a pair of pins 54 and 55 which are secured to an upper bracket plate 56 disposed in a plane parallel to the latch bar; plate 56 in turn is fastened by screws 57 to a lower bracket plate 58 secured to table 17. Pin 54 engages a lower recessed edge surface 59 of latch bar 53 to limit downward displacement thereof while pin 55 extends through an elongated slot 60, formed in bar 53, to limit longitudinal travel of the bar. A coil spring 61 has one end secured to a pin 62 on upper plate 56 and the other end is secured to bar 53 to bias the latter downwardly and into engagement with pin 54. A microswitch 63 is secured to upper plate 56 by threaded means 64, and in the present invention is connected in a circuit (not shown) which includes a motor (not shown) for driving sprocket wheel 23 and an audible and visual alarm device (not shown). It is to be understood that in a first position of the contacts (not shown) of switch 63 the motor is energized to effect rotation of sprocket wheel 23 while the alarm is de-energized; when the contacts of the switch are in a second position the motor is de-energized and the alarm device is energized. The casing of switch 63 is provided with a post 65 for pivotally mounting a lever 66 at a point 67 and the lever is provided with a projection 68 which is adapted to engage and depress a plunger type button 69. In the "up" position of button 69, as shown in Fig. 1, the mentioned contacts are in the first position to cause energization of the motor and de-energization of the alarm device, while the depressed position of the button effects the second position of the contacts wherein the motor is de-energized and the alarm is energized. The other end of lever 66 is provided with a roller 70 which is adapted for seating in an arcuate portion 71 of latch bar 53.

As indicated hereinbefore, under non-slip conditions output means 50 rotate in a counterclockwise direction and pins 52 of the output means 50 successively raise latch bar 53 from engagement with pin 54, but the bar is returned into engagement with pins 52 after each upward movement, by spring 61. Under such conditions, lever 66 remains in the position shown in Fig. 1. Upon differential motion between sprocket wheel 23 and shaft 12, however, output means 50 rotates in a clockwise direction and a pin 52 displaces latch bar 53 to the right in Fig. 1 to cause roller 70 to move out of arcuate portion 71. As a result, lever 66 pivots in a clockwise direction and projection 68 depresses plunger button 69 to actuate the contacts of switch 63 to the second position to de-energize the motor and energize the alarm device. In this manner, further rotation of sprocket wheel 23 is prevented and a warning is given to an operator that slip conditions exist. After the overload condition has been corrected, latch bar 53 is reset to again engage pin 52 whereby the contacts of switch 63 are actuated to the first position to again energize the motor and de-energize the alarm device.

While the differential motion actuated mechanism 28 of the present invention has been disclosed with the output end thereof having a disc-pin structure to actuate a latch bar or pawl, it is to be understood that any suitable means, as for example, tachometer, sprocket wheel, gear or drag cup, may be employed to utilize the relative rotation of the sprocket wheel and the shaft to perform a useful function. It is to be further understood that the rotary power transmitting assembly herein described is only illustrative in that the present invention may be employed with any similar rotary transmitting assembly as for example a fly wheel, or clutched pulley wheel mounted on a shaft.

In addition, the present invention may be used where a rotary transmitting assembly is disposed between the ends of a shaft. In this modification the sun gear may be secured to the shaft by means of set screw and the driven sleeve may be rotatably mounted directly over the shaft.

It is also to be understood that it is within the contemplation of this invention to provide gears of various sizes to provide gear ratios necessary for producing a desired speed of rotation of the output member of the differential motion actuated mechanism.

While a specific embodiment of the invention has been described, variations in structure within the scope of the claims are possible and are contemplated. There is no contention, therefore, of limitation to the exact details shown and described.

What is claimed is:

1. A device of the class described, comprising a rotary driving member, a motor means for producing rotary power, said motor means being connected to said rotary driving member to impart to the latter rotation in a preselected direction and angular speed, a loaded rotary driven member disposed in co-axial relationship with said driving member, clutch means operatively connecting said driving member to said driven member for effecting rotation of the latter at the same angular speed as the driving member and in said preselected direction as the driving member when the load on said driven member is less than a predetermined value and allowing rotation of the driven member in said preselected direction at a lesser angular speed than said driving member when the load is at the predetermined value, an output member, a differential motion actuated mechanism interconnecting the driving and driven members and said output member, said mechanism comprising a first gear, a second gear, said first and said second gears being mounted on said driving member for conjoined rotation about their respective axes and carried by said driving member in a circular path about the axis of the driven member in said preselected direction and at the same angular speed as said driving member, a third gear fixedly mounted coaxially on said driven member for conjoined rotation with the driven member, said third gear being disposed in mesh with said first gear for providing rotation of the latter and said second gear about their axes in said preselected direction when said third gear and driven member rotate at a lesser angular speed than the angular speed at which said first and second gears are carried in said circular path by said driving member, a fourth gear, said fourth gear and said output member being mounted for conjoined rotation with each other on the driven member in co-extensive relationship to the axis of rotation of said driven member and relative to said driven member, said fourth gear being disposed in meshing relationship with said second gear so that said rotation of the latter about its axis in said preselected direction rotates the fourth gear and said output member, said first, second, third and fourth gears having a ratio to each other so as to cause rotation of said fourth gear and output member in a direction opposite of said preselected direction when said third gear and driven member rotate at a predetermined lesser angular speed than the angular speed at which said first and second gears are carried in said circular path by said driving member, switch mechanism electrically connected to said motor means to control the operation of the latter, and an actuating arm mounted for linear movement adjacent the output member and engaging said switch mechanism to actuate said switch upon linear movement of the actuating arm, said output member having means carried by said output member for engaging said actuating arm upon rotation of said output member and said means in a direction opposite of said preselected direction to linearly displace said actuating arm and actuate said switch mechanism to stop said motor means and thereby rotation of said driving member.

2. A device of the class described, comprising a rotary driving member, a motor means for producing rotary power, said motor means being connected to said rotary driving member to impart to the latter rotation in a preselected direction and angular speed, a loaded rotary driven member disposed in co-axial relationship with said driving member, clutch means operatively connecting said driving member to said driven member for effecting rotation of the latter at the same angular speed as the driving member in said preselected direction when the load on said driven member is less than a predetermined value and allowing rotation of said driven member in said preselected direction relative to driven member when the load is at said predetermined value, an output member, a differential motion actuated mechanism interconnecting the driving and driven member and output member, said mechanism comprising a stud secured to said driving member and extending parallel to the axis of rotation thereof, said stud being carried by said driving member in a circular path about the axis of said driving member in said preselected direction and at the same angular speed as the driving member, a sleeve mounted for axial rotation on said stud, a first gear, a second gear, said first and second gears being secured to said sleeve for conjoined rotation with said sleeve, a third gear secured coaxially to said driven member for conjoined rotation with the latter and in mesh with said first gear to cause rotation of the latter and said second gear about said stud and in said preselected direction when said third gear and the driven member rotate at a lesser angular speed than the angular speed at which said first and second gears are carried by said stud in said circular path, a fourth gear, said fourth gear and said output member being mounted on the driven member in coextensive relationship to the axis of rotation of said driven member for conjoined rotation with each other in said preselected direction, said fourth gear disposed in meshing relationship with said second gear so that rotation of the latter in said preselected direction rotates the fourth gear and said output member, said first, second, third and fourth gears having a ratio to each other so as to cause rotation of said fourth gear and output member in an opposite direction of said preselected direction when said third gear and the driven member rotate at a predetermined lesser angular speed than the angular speed at which said first and second gears are carried by said stud in said circular path, a switch mechanism electrically connected to said motor means to control the operation of the latter, an arm mounted for linear movement adjacent the output member and engaging said switch mechanism to actuate said switch upon linear movement of the arm, said output member having means carried by said output member for engaging said arm upon rotation of said output member and said means in a direction opposite of said preselected direction to linearly displace said arm and actuate said switch to stop said motor means and thereby rotation of said driving member.

3. A device of the class described, comprising a rotary driving member, a motor means for producing rotary power, said motor means being connected to said rotary driving member to impart to the latter rotation in a preselected direction and angular speed, a loaded rotary driven member disposed in concentric relationship with said driving member, clutch means operatively connecting said driving member to said driven member for effecting rotation of the latter at the same angular speed as the driving member and in said preselected direction when the load on said driven member is less than a predetermined value and allowing rotation of the driven member in said preselected direction at a lesser angular speed than said driving member when the load is at said predetermined value, an output member, a differential motion actuated mechanism interconnecting the driving and driven member and output member, said mechanism comprising a stud secured to said driving member and extending parallel to the axis thereof, said stud being carried by said driving member in a circular path about the axis of said driving member in said preselected direction and at the same angular speed as the driving member, a first sleeve mounted for axial rotation on said stud, a first gear, a second gear, said first and second gears being secured to said sleeve for conjoined rotation with each other and with said sleeve and carried in a circular path about the driven member by said driving member in said preselected direction, a third gear secured coaxially to said driven member for conjoined rotation with the latter and in meshing relationship with said first gear to cause rotation of the latter and said second gear about said stud when said third gear and driven member rotate at a lesser angular speed than the angular speed at which said first and second gears are carried by said stud in said circular path by said driving member, an extension member secured to said driven member in coextensive relationship to the axis of the driven member, a second sleeve mounted on said extension member for rotation thereon, a fourth gear secured to said second sleeve and in meshing relationship with said second gear, said second gear causing rotation of said fourth gear and said second sleeve, said first, second, third and fourth gears having a ratio to each other so as to cause rotation of said fourth gear and said second sleeve in a direction opposite of said preselected direction when said third gear and driven member rotate at a predetermined lesser angular speed than the angular speed at which said first and second gears are carried by said stud in said circular path by said driving member, said output member being secured to said second sleeve so that said output member rotates in an opposite direction from said preselected direction upon rotation of said fourth gear in said opposite direction, an electrical switch connected to said motor means to control operation of the latter, an arm mounted for linear movement adjacent said output member, said arm having means for actuating said electrical switch upon linear movement of said arm, said output member having second means carried by said output member for engaging one end of said arm so that rotation of said output member and said second means in a direction opposite of said preselected direction linearly displaces said arm and thereby actuates said electrical switch to thereby stop said motor means and rotation of the driving member.

4. A device of the class described, comprising a driving sprocket wheel, a motor means for producing rotary power, said motor means being connected to said sprocket wheel to impart to the sprocket wheel rotation in a preselected direction and angular speed, a loaded shaft disposed in concentric relationship with said sprocket wheel, a clutch means operatively connecting said sprocket wheel to said shaft for effecting rotation of the latter at the same angular speed as said sprocket wheel and in said preselected direction when the load on said shaft is less than a predetermined value and allowing rotation of said shaft in said preselected direction at a lesser angular speed than said sprocket wheel when the load on said shaft is at said predetermined value, a base member to support said shaft for rotation, a differential motion actuated mechanism comprising a first gear, a second gear, said first and second gears being mounted on said sprocket wheel for conjoined rotation about their respective axes and in a circular path about the axis of the shaft at the same angular speed as said sprocket wheel and in said preselected direction, a third gear fixedly mounted coaxially on said shaft for conjoined rotation with said shaft, said third gear being in meshing relationship with said first gear to rotate the latter and said second gear about their axes in said preselected direction when said third gear and the shaft rotate at a predetermined lesser angular speed than the angular speed at which said first and second gears are carried in said circular path by said sprocket wheel, an output member including spaced discs having a plurality of circumferentially spaced pins joined at their opposite ends to said discs, a fourth gear, said output member and said fourth gear being mounted on the shaft in coextensive relationship to the axis of rotation of the shaft and for conjoined rotation with each other, said fourth gear being disposed in meshing relationship with said second gear so that rotation of the latter rotates the fourth gear and said output member including said pins, said first, second, third and fourth gears having a ratio to each other so as to cause rotation of said fourth gear and said output member including said pins in a direction opposite of said preselected direction when said third gear and the shaft rotate at a predetermined lesser angular speed than the angular speed at which said first and second gears are carried in said circular path by said sprocket wheel, a latch bar slidably supported by said base member adjacent said output member, an electrical switch connected to said motor means to control operation of the latter, said latch bar having means for actuating said electrical switch upon slidable movement of said latch bar, said latch bar being in engagement at one end with the pins of the output member so that the rotation of the output member including said pins in a direction opposite said predetermined direction slidably displaces said latch bar and actuates said electrical switch to stop said motor means and thereby rotation of said sprocket wheel.

References Cited in the file of this patent
UNITED STATES PATENTS

| | | |
|---|---|---|
| 1,839,992 | Petrelli | Jan. 5, 1932 |
| 2,417,528 | Ten Cate et al. | Mar. 18, 1947 |
| 2,431,117 | Hadley | Nov. 18, 1947 |
| 2,469,170 | Mastney et al. | May 3, 1949 |
| 2,695,089 | Unk et al. | Nov. 23, 1954 |

FOREIGN PATENTS

| | | |
|---|---|---|
| 225,164 | Great Britain | Dec. 4, 1924 |